3 Sheets—Sheet 1.

C. WHIPPLE.

CUTTING THREADS OF WOOD SCREWS.

No. 371. Reissued June 13, 1856.

THE NORRIS PETERS CO., PHOTO-LITHO., WASHINGTON, D. C.

C. WHIPPLE.

CUTTING THREADS OF WOOD SCREWS.

No. 371. Reissued June 13, 1856.

THE NORRIS PETERS CO., PHOTO-LITHO., WASHINGTON, D. C.

C. WHIPPLE.
CUTTING THREADS OF WOOD SCREWS.
No. 371. Reissued June 13, 1856.
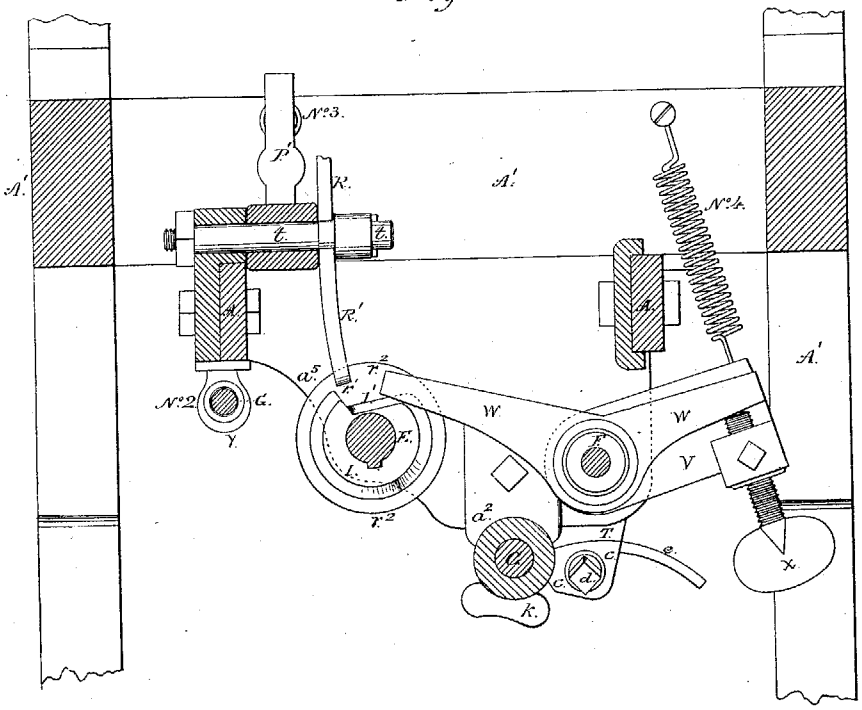
THE NORRIS PETERS CO., PHOTO-LITHO., WASHINGTON, D. C.

UNITED STATES PATENT OFFICE.

CULLEN WHIPPLE, OF PROVIDENCE, RHODE ISLAND.

MACHINE FOR CUTTING THE THREADS OF WOOD-SCREWS.

Specification forming part of Letters Patent No. 2,754, dated August 18, 1842; Reissue No. 165, dated March 5, 1850; Reissue No. 371, dated June 13, 1856.

*To all whom it may concern:*

Be it known that I, CULLEN WHIPPLE, of Providence, in the county of Providence and State of Rhode Island, have invented a new and useful Machine for Cutting the Threads of Wood-Screws; and I do hereby declare that the following is a full, clear, and exact description of my invention and of the manner of making, constructing, and using the same, reference being had to the accompanying drawings, making part of this specification, and in which—

Figure 1:
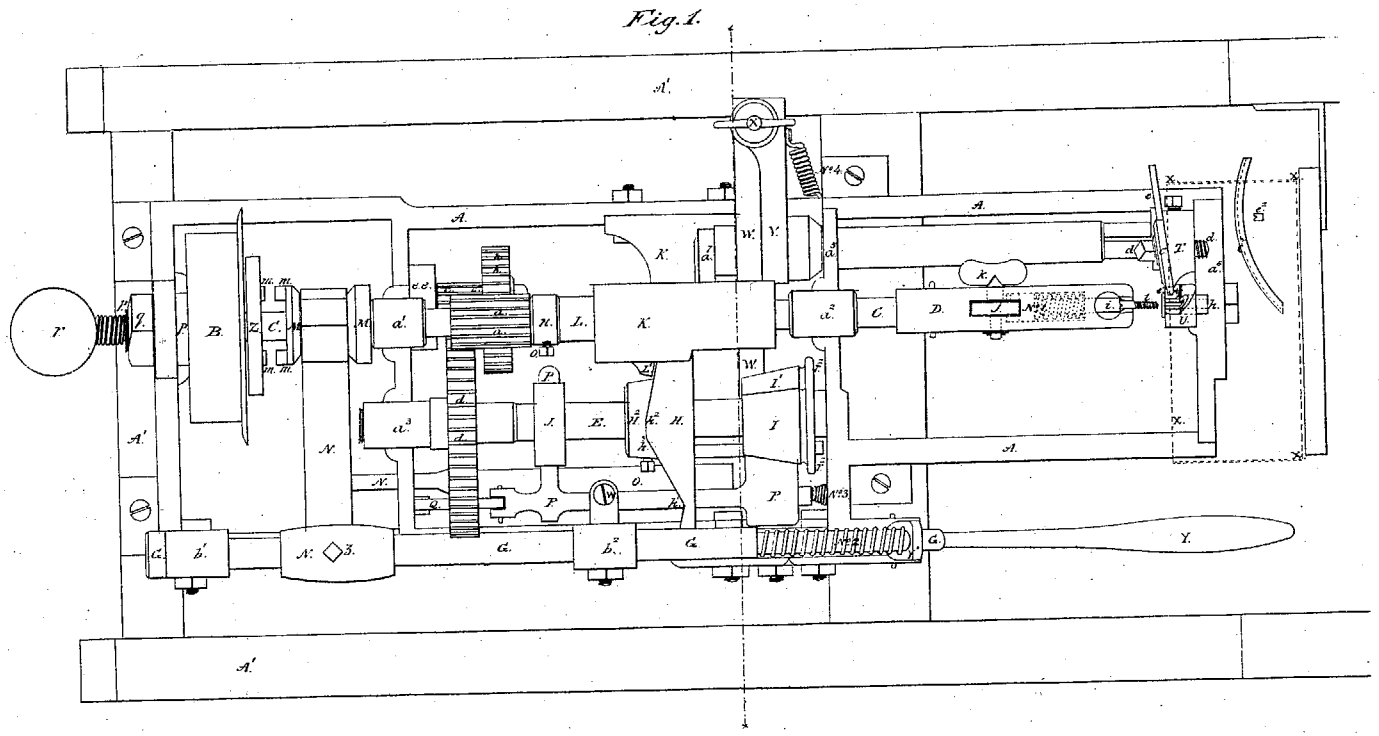
Figures 2, 4:
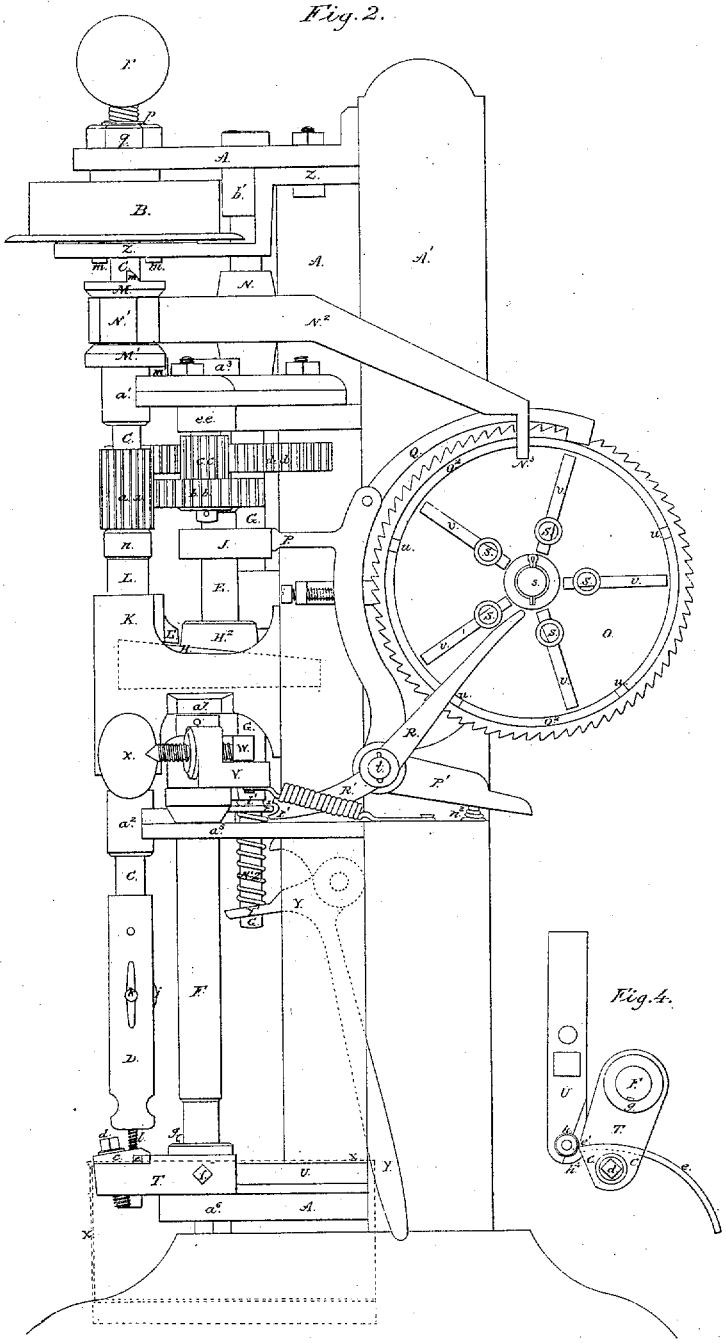

Figure 1 is a front elevation of the machine; Fig. 2, a side elevation; Fig. 3, a horizontal section at the line *x x* of Fig. 1, and Fig. 4 a top view of the bed-piece which carries the blank tube and the arm which carries cutter.

The same letters indicate like parts in all the figures.

In this machine the blank to be threaded is held in and carried by a spindle or mandrel which has a rotating movement during the chasing of the thread, and a reciprocating longitudinal movement in the line of its axis, to determine the pitch of the thread and to return it for each successive cut; and the chaser or cutting-tool is on an arm of a shaft which has a rocking motion to withdraw the chaser from the screw-blank at the end of each chasing operation, and to carry the chaser toward the axis of the screw-blank at the commencement of each operation, to determine the depth of each successive cut, and during each cut, to determine the form of the core or body of the screw. The motions necessary to be given to determine the pitch of the thread and the form of the core or body of the screw are governed by two cams, one of which performs the double function of determining the depth of each successive cut and the approach of the chaser or cutter toward the axis of the screw-blank during each cut to determine the form of the core or body of the screw within the thread; and, in addition to the motions above named, there is another cam or eccentric which operates a ratchet-motion to turn an index-wheel which determines the opening of a clutch or stop-motion to disengage the moving parts from the driving-pulley or driving-shaft so soon as a screw is entirely threaded, that it may be removed and another blank inserted, and also at the end of each successive cut to shift the cam which determines the depth of each successive cut. The cutter or chaser is made with a groove in one face to determine the form to be given to the thread, so that the said cutter or chaser may be sharpened by grinding from the end alone and without changing the form of the recess or groove which determines the form of the thread.

The nature or principle of this invention which distinguishes it from all other things before known consists, first, in giving the longitudinal reciprocating motion for determining the pitch of the thread in chasing the same, and for returning to repeat the operation by means of a wedge-formed cam; second, in causing the chaser or cutter at each successive cut to approach nearer to the axis of the screw-blank by means of a cam which at each successive cut acts by a greater radius; third, in regulating the depth of cut of the chaser or cutter along the length of the screw to give to it the required taper along the whole or any part of its length by combining with the chaser a cam of gradually-enlarged diameter; fourth, in combining the wedge-formed cam which gives the reciprocating motion to determine the pitch of the thread and to return for the repetition of the operation with the shaft or mandrel which carries and rotates the screw-blank by means of a tube in which the said shaft or mandrel rotates, the said tube being acted upon by the wedge-formed cam to give the required longitudinal motion; fifth, in combining the cam which determines the form to be given to the core or body of the screw with the cutter or chaser by means of a rock-shaft and lever, the said rock-shaft being provided with an arm connected with the said lever by means of a set-screw or other analogous means of adjustment; sixth, in shifting the cam which determines each successive cut of the chaser or cutter by combining therewith a ratchet operated by an eccentric or cam, the wheel of the ratchet being provided with pins that operate a lever that is connected with and which acts on the cam to shift it at the end of each successive cut; seventh, in operating a clutch or stop motion to disconnect the shaft or mandrel from the driving-power at the end of each complete operation of the machine by combining the clutch or stop with the ratchet by means of an index-wheel, which at the required periods liberates or acts upon the connections of the clutch or stop-motions; eighth, in making the chaser or cutter for chasing or cutting wood-screws by machinery with a groove in its cutting-face of the form of the intended thread, or nearly so, that it may cut on both sides of the thread at the same time and finally on the edge, and admit of being sharpened by grinding on the end and without changing the form of the said groove; ninth, in combining with the mandrel a screw-driver for holding and rotating the screw-blank, while the thread is being cut or chased thereon, a tubular rest for supporting the blank laterally and preventing it from vibrating or springing and climbing on the chaser or cutter, there being a slot or opening in the side of the tubular rest sufficient to admit the chaser or cutter to operate on the blank, but leaving the latter surrounded as far as possible by the rest, that it may be firmly held on all sides.

In the accompanying drawings, A A A is the frame, which is usually made of cast-iron, and to which is ordinarily attached an auxiliary frame and stand, A′ A′, of wood.

B is a driving-pulley, which may be turned by a band from a drum actuated by any motive power, and which is to be made to revolve with great rapidity—say at the rate of five hundred times in a minute.

C C is the main shaft, spindle, or mandrel, upon which the pulley B is situated. This pulley revolves freely upon the shaft C, except when clutched by the sliding clutch M, which, when raised, engages with the pulley by means of the horns or catches *m m* on the clutch and pulley. The shaft then revolves with the pulley B, the shaft and clutch being connected by a feather. The clutch M is raised by the shipper N N, the end N′ of said shipper embracing the neck of the clutch between its collars M M′. The shipper N N is attached by a set-screw, *z*, in the socket N to an upright sliding rod, G G′, which passes through the sockets $b'$ $b^2$. The head G′ prevents the rod from descending too low, and it is raised by means of the handle Y, which constitutes a bent lever, as shown at Y Y, Fig. 2, the part Y′ being formed into a ring embracing the rod G, and bearing against the spiral spring No. 2 surrounding said rod, said spiral spring causing the rod to rise with an elastic or yielding motion. The handle Y is to be drawn forward, so as to cause the shaft C to revolve during the time a screw is being cut. When let go, it will fall back by its own weight and by that of the rod G, and the pulley B will be out of gear and revolve loosely upon its shaft. The shaft C C revolves and slides up and down freely in the collars or sockets $a'$ and $a^2$, which are stationary and attached permanently to the frame. At its lower end the shaft C carries the holder D, which receives and holds the blank that is to be cut. This holder is in the form of a hollow socket or tube pinned or otherwise fastened to the shaft, and may be changed at pleasure to suit blanks of different sizes. It has within it a driver or sliding bolt, *i*, furnished with a projecting edge at its lower end, which fits into the nick or slit in the head of the blank in the manner of a screw-driver, and holds it while it is being cut into a screw. The sliding bolt *i* is borne up by a spiral spring, (shown in dotted lines at No. 1,) which spring surrounds it, and it is forced down by a cam or eccentric, *j*, that is turned by thumb-piece *k*. When a screw has been cut, as shown at *l*, Fig. 1, the shaft C rests in the position represented in the drawings, admitting of the ready removal of the screw and the feeding with a blank, which is effected by the hand of the attendant.

The shaft C C is made to slide up and down in the following manner while the screw is being cut by a cam, H, or circular wedge, which is fixed onto the shaft or arbor E by means of its hub $H^2$, which may be screwed in place by a screw or wedge, and may be changed at pleasure for screws of different sizes. This cam or circular wedge, with its shaft E, is made to revolve by suitable gearing from the shaft C C in the following manner:

*a a* is a pinion on the shaft, spindle, or mandrel C, which pinion is made sufficiently long to keep it in gear while the shaft slides up and down. It is attached to the shaft by means of a feather, and rests upon a collar, *n*, which is made fast to the shaft by a set-screw, *o*, thus admitting of the adjusting of the place of the pinion *a a* upon the shaft. This pinion gears into a wheel, *b b*, which has attached to it the pinion *c c*, gearing into the wheel *d d* on the cam-shaft E.

It will be manifest to every machinist that the manner of arranging the respective wheels and pinions and of communicating motion from the shaft C to the shaft E may be varied; but I have given that which I have used and consider the most simple and convenient.

K is a box or socket through which the shaft C passes without touching it, the opening through it being sufficiently large for that purpose.

L is a tube, which is fitted onto the shaft C and slides up and down with it. Said tube is received and slides accurately within the box K, and has a piece, L′, projecting from its lower end, which rests upon the circular wedge H, there being a slot through the side of the box K, through which the piece L′ passes, admitting the tube L to slide up and down, and at the same time checking it from revolving with the shaft. The upper edge of the circular wedge H if opened out would form a regular inclined plane from the point $h'$ to the point $h^2$, the rise of which is to be equal to the length to which a screw-thread is to be cut, the cutting continuing during the time the shaft C is rising. When the piece L′ arrives at the point $h^3$ the cutting is suspended and the shaft C descends, the piece L′ passing down the inclination from that point to $h'$, when the cutting again proceeds.

Z Z (seen most distinctly in Fig. 2) is a stand or support under the pulley B, and making part of the frame of the machine.

$p$ is a hollow stud to hold the driving-pulley, and $q$ a nut on its end.

$r$ $r$ are a weight and stem, the latter of which bears upon the upper end of the shaft C, insuring its descent when permitted by the circular wedge or cam. The cutter or chaser, by means of which the threads are to be cut, is peculiar in its form and action, as it is made to cut upon each side of the thread at the same time, and finally upon the edge, by which means said edge is made perfectly smooth and even in a manner not heretofore attempted in the cutting of wood-screws. This cutter or chaser is shown in place at $e$ $e'$, Fig. 1, and a side view and cross-section of it are shown at $e^2$. Its peculiarity consists in forming a groove on its convex or cutting side of such size and depth as shall adapt it to the thread to be cut.

In making these cutters I usually proceed in the following manner: I take a square piece of steel of suitable size, which I form into a hoop or ring. This I put into the lathe and face it truly on each side and turn it true on its outside or periphery, and then cut a groove in it around said periphery, as represented by the notch seen in the cutting end at $e'$, giving to said groove the desired shape and size of the intended thread of the screw. This ring I divide into sections and harden and temper these sections throughout their whole length. The groove and cutting face I render smooth and polished, and grind the end or ends to such a bevel as to give good cutting-edges on the grooved side. The width of the cutter on each side of the groove must be somewhat less than that of the space between each thread of the screw. As these cutters become dull they are readily sharpened, and this sharpening can be repeated until they are worn too short for use. U is a steel bed piece or rest, which is bolted or fastened onto the bottom of the frame A. Through this a hole is drilled to receive a steel tube, $h$, the bore of which corresponds to the size of the wire or shank of the blank from which a screw is to be cut. The bed-piece U alone may be used by drilling through it a hole of suitable size. The bed piece or rest must be so adjusted as to bring the hole through it directly under the center of the shaft C, and it and the contained tube are to be slotted or cut away on one side, as shown at $h^4$, for example, so as to admit the cutter to operate on the blank. This tubular rest is of great importance, as it supports the blank firmly and steadily while under the operation of the cutter or chaser, and prevents those irregularities in the thread of the screw which would result from any unsteadiness of the blank during the operation of threading it.

Fig. 4 is a top view of the bed-piece U, the arm T, and the cutter. The cutter is to be fixed in a cutter post or arm, T, at the lower end of the rock-shaft F, $f$ being a set-screw, by which it may be held in place, and $g$ a key to prevent its turning on the shaft.

$c$ is a cap-piece which, by means of the screw-bolt $d$, holds the cutter in its place. The shaft or arbor F turns on gudgeons at its upper and lower ends in the parts $a^6$ and $a^7$ of the frame.

V is an arm made fast to the shaft F near to its upper end, and to the outer end of this arm is attached a spiral spring, No. 4, which draws it back and relieves the cutter $e'$ from its action, excepting when the arm V is forced forward by means to be presently described.

X is a set-screw, which passes through the outer end of the arm V and bears upon one end of the curved lever W, the fulcrum of which is the shaft F. The set-screw X serves to regulate the position of this lever. The arrangement of this part will be shown more plainly by the sectional view, Fig. 3, which is made horizontal in the line $x$ $x$ of Fig. 1. In this figure W is a top view of the above-named curved lever, having its fulcrum on the shaft F, and bearing against the set-screw X at one of its ends, and against what I denominate the conical feed-cam I at its other end. The conical feed-cam is situated on the shaft E, and slides up and down upon it by means of a feather, by which the two are made to revolve together. The cam I is in the general form of a frustum of a cone; but it has a recess or cavity, I′, cut in it to receive the end of the lever W once in each revolution. This recess corresponds with the descending parts $h^3$ $h'$ of the circular wedge H, the lever W falling into said recess by the action of the spiral spring No. 4 just before the shaft C C begins to descend, and by this means the cutter or chaser $e$ is withdrawn from the screw until the shaft C has reached its lowest point, and as it begins to ascend the cam I will have turned far enough for the shoulder of the recess I′ to act on the lever W, and thereby to force the chaser or cutter against the piece to be cut.

In order to feed the cutter to the blank, the cam I is to be raised up on the shaft E at every successive action of the cutter, and as it acts by an increased diameter on the lever W it causes a new chip to be cut at each rise. The whole difference in the diameter of the upper and lower part of the cone is equal to the depth of the thread, and when the cone has been raised to its greatest height the cutting will be completed.

Although I have denominated this cam the conical cam, it is not absolutely conical, but its periphery or surface recedes from its axis or center in the manner of a scroll, and causes the chip taken off by the cutter to increase slightly in thickness as it proceeds, thus giving the desired taper to the screw, the amount of which taper will depend on the amount of enlargement of the conical cam from its scroll-like form. The recess I′, opposite to the shoulder in which the lever W enters to permit the cutter to be drawn from the screw-blank, is curved so as to carry the cutter or chaser toward the axis of the blank with a movement so fast as to make the conical form much more abrupt at the point than along the other parts of the thread.

The conical cam is successively raised, and other motions connected therewith are performed in the following manner:

O, Figs. 1 and 2, is a wheel revolving on an arbor or stud, *s*, and having ratchet-teeth cut upon its periphery.

$O^2$ is a flange or rim projecting from the face of this wheel to the distance of half or three-fourths of an inch.

$N^2$ is an inflexible arm in one piece with and extending back nearly at right angles from the shipper N. The end $N^3$ of the arm $N^2$ bears upon the rim $o^2$ as the wheel O revolves until one of the notches *u u*, made through the rim, is brought under $N^3$, which then falls into it, allowing the shipper to descend, and throwing the pulley B out of gear with the shaft C.

P P is a bent lever having its fulcrum at *t*, and being borne up at the end of its short arm P′ by the spring No. 3.

Q is a catch jointed to the lever P, and operating on the teeth of the ratchet-wheel, so as to draw said wheel back to the distance of one tooth at every vibration of the lever P. This lever is acted upon by a cam, J, on the shaft E, and the distance of its play is regulated by a set-screw, *w*.

S S are pins projecting from the face of the ratchet-wheel, and rising therefrom to the distance of an inch and a half, more or less. The distance of these pins from the center of the wheel may be regulated by means of screw-nuts and the slots *v v*. As the wheel O revolves, the pins S S are brought necessarily into contact with the arm R of the lever R R′, and depress it until its end escapes from the pin. The short arm R′ of this lever has a recess or hollow, *r*′, in the end of it, which embraces the bead $r^2$ $r^2$ on the lower end of the conical cam, and as the wheel O is drawn round to the distance of a tooth the cam is raised to a corresponding height. The number of shavings cut from each blank will correspond with the number of teeth between each section or pin S on the ratchet-wheel, the conical cam being raised to the full height in that distance of the movement of the wheel, and the lever R escaping from one pin to be acted upon by the next in the same distance.

To arrest the motion of the shaft C, so as to cause it to stand in the proper position for removing the cut screw, and for supplying a blank, a notch is formed in the bottom rim, M′. of the shipper, Fig. 2, and a stump, *m*′, is made fast to the frame, which stump is received into said notch, this being so situated as to hold the shaft in the required position.

In using this machine the blank, while being acted upon by the cutter, is kept within a tin or other box containing water or other fluid. This situation of this box is shown by the lines *x x*.

The above invention in many of its separate parts and combinations may be greatly varied within the principles hereinafter to be claimed or intended to be claimed—as, for instance, the wedge form of the cam for determining the pitch of the thread, instead of being on the face of the wheel, might be made on the periphery. I am aware, however, that a reciprocating or vibrating cam or inclined slide has been used for analogous purposes in lathes, but not in the manufacture of wood-screws. The cam which determines the depth of each successive cut and the form of the core or body of the screw, instead of being a single cam, might be divided, and one used for each of the separate functions; or one of its properties might be dispensed with, for in making screws with a cylindrical core or body one of the properties of this cam is of no use, and the functions which the cams perform may be effected by combinations or arrangements of machinery different from those above described, although not to so great advantage; and the cutter or chaser, instead of being made in the form of a ring, with the groove cut or turned in the outer periphery thereof, and then cut into sections, may be made straight, with the groove cut in one face. It will be obvious, therefore, from the foregoing that many modifications may be made in the mode of constructing and applying the principles which distinguish this from other inventions before known for like or analogous purposes.

What is claimed as new, and desired to be secured by Letters Patent, is—

1. In combination with the shaft or mandrel which gives the rotary motion to the screw-blank, the employment of the rotating wedge-formed cam, or the equivalent thereof, for determining the pitch of the thread and for permitting the return motion to repeat the operation, substantially as described.

2. Causing the chaser or cutter at each successive cut to approach nearer to the axis of the screw-blank by means of a revolving conical cam, which at each successive operation acts by a greater radius, substantially as described.

3. Governing the motions of the chaser or cutter to make the core or body of the screw of a conical or tapered form along the whole or any part of its length by combining therewith a cam of gradually-enlarged diameter, substantially as described, the form of such cam depending on the form intended to be given to the core or body of the screw.

4. Combining the cam which determines the form of the core or body of the screw (to make it tapering or conical in whole or in part) with the chaser or cutter by means of a rock-shaft and adjusting-lever, substantially as herein described, the said adjusting-lever being interposed between one of the arms of the rock-shaft and the face of the cam, so that by the use of a set-screw or other analogous device the cutter or chaser may be readily set, as described.

5. Shifting the cam which determines each successive cut of the chaser or cutter by combining therewith a ratchet movement operated by an eccentric or cam, the wheel of the ratchet being provided with pins which operate a lever connected with the cam to shift, substantially as described.

6. Disconnecting the shaft or mandrel from the driving-power at the end of each complete operation of the machine by combining the clutch, or the equivalent thereof, with the ratchet by means of an index-wheel or perforated rim, which at the required periods liberates or acts upon the connections of the clutch to disengage it, substantially as described.

7. Making the chaser or cutter for chasing or cutting the threads of wood-screws by machinery with a groove of the form of the thread in its cutting-face and in the direction of its length, substantially as described, whereby the said chaser can be sharpened by simply grinding off at the end and without changing the form of the groove, and whereby, also, the said chaser cuts on both sides of the thread, and finally on the edge thereof, as described.

8. The combination of the screw-driver for holding and rotating the screw-blank with the tubular rest open at the side to support the shank of the blank while being threaded, substantially as described.

In testimony whereof I have hereunto subscribed my name.

CULLEN WHIPPLE.

In presence of—
CHARLES F. TILLINGHAST,
P. H. WATSON.